United States Patent [19]
Toyozumi et al.

[11] Patent Number: 5,410,227
[45] Date of Patent: Apr. 25, 1995

[54] VEHICLE WINDOW OPENING AND CLOSING METHOD AND APPARATUS FOR DETECTING AN OBSTACLE UTILIZING SOUND WAVE

[75] Inventors: Morihiko Toyozumi, Mie; Shinichiro Takahashi, Osaka, both of Japan

[73] Assignees: Sumitomo Wiring Systems, Ltd., Mie; Sumitomo Electric Industries, Ltd., Osaka, both of Japan

[21] Appl. No.: 102,990

[22] Filed: Jul. 28, 1993

[30] Foreign Application Priority Data

Sep. 2, 1992 [JP] Japan ................................. 4-260676

[51] Int. Cl.⁶ ............................................. H02P 3/00
[52] U.S. Cl. ...................... 318/283; 318/460; 49/26
[58] Field of Search ............................ 318/280–286, 318/16, 445, 460; 49/24–26, 28, 141; 180/167, 271; 160/291

[56] References Cited

U.S. PATENT DOCUMENTS

| | | | |
|---|---|---|---|
| 3,367,450 | 2/1968 | Lester et al. | 49/26 |
| 3,627,082 | 4/1970 | Berkovitz | 49/27 |
| 3,742,434 | 6/1973 | Leyde et al. | 49/25 X |
| 3,996,792 | 12/1976 | Kubota et al. | |
| 4,029,176 | 6/1977 | Mills | 49/25 X |
| 4,413,210 | 11/1983 | Gronau | 318/16 |
| 4,453,112 | 6/1984 | Sauer et al. | 318/281 |
| 4,621,452 | 11/1986 | Deeg | 49/28 |
| 4,641,067 | 2/1987 | Iizawa et al. | |
| 4,706,227 | 11/1987 | Duvall et al. | 49/25 X |
| 4,907,136 | 3/1990 | Jorgensen | |
| 5,107,467 | 4/1992 | Jorgensen et al. | |
| 5,214,408 | 5/1993 | Asayama | 180/167 X |

FOREIGN PATENT DOCUMENTS

| | | |
|---|---|---|
| 0360780 | 3/1990 | European Pat. Off. |
| 4030607 | 4/1992 | Germany |
| 1117664 | 6/1968 | United Kingdom |

OTHER PUBLICATIONS

Patent Abstracts of Japan, vol. 10, No. 250 (P-491)(2306) Aug. 28, 1986; and JP-A-079 177 (Daihatsu Motor).

*Primary Examiner*—Jonathan Wysocki
*Attorney, Agent, or Firm*—Sughrue, Mion, Zinn, Macpeak & Seas

[57] ABSTRACT

This invention aims to prevent an obstacle from being trapped between a vehicle window and a window frame. A supersonic wave f is emitted into a vehicle window W. A reflection wave i of the supersonic wave is received to decide whether the reflection wave i is one reflected from peripheral faces of a target to be detected or not. If the received reflection wave i is one reflected from the peripheral faces from the target, a driving motor M for the vehicle window W is stopped. Thus, when an obstacle contacts with the peripheral faces of the vehicle window, it is possible to previously prevent the obstacle from being caught by the window since a driving source for the vehicle window is stopped.

7 Claims, 9 Drawing Sheets

ID AN OBSTACLE UTILIZING SOUND WAVE

BACKGROUND OF THE INVENTION

1. Field of the Invention

This invention relates to an opening and closing apparatus for a vehicle window which is mounted in a vehicle such as an automobile or the like and is driven into open and closed positions by a driving source, and to an opening and closing method for the vehicle window in the apparatus.

2. Statement of the Prior Art

Recently, most automobiles are provided with an opening and closing apparatus of a vehicle window known as a power window which employs a motor.

Since power windows can be opened and closed by means of a switch, ease and safety of operation are assured.

However, since the power window or vehicle window is opened and closed under the driving force of a motor, obstacles tend to become trapped between the vehicle and the window frame and leading, on occasion, to serious problems, accident and injury.

Figure 12:
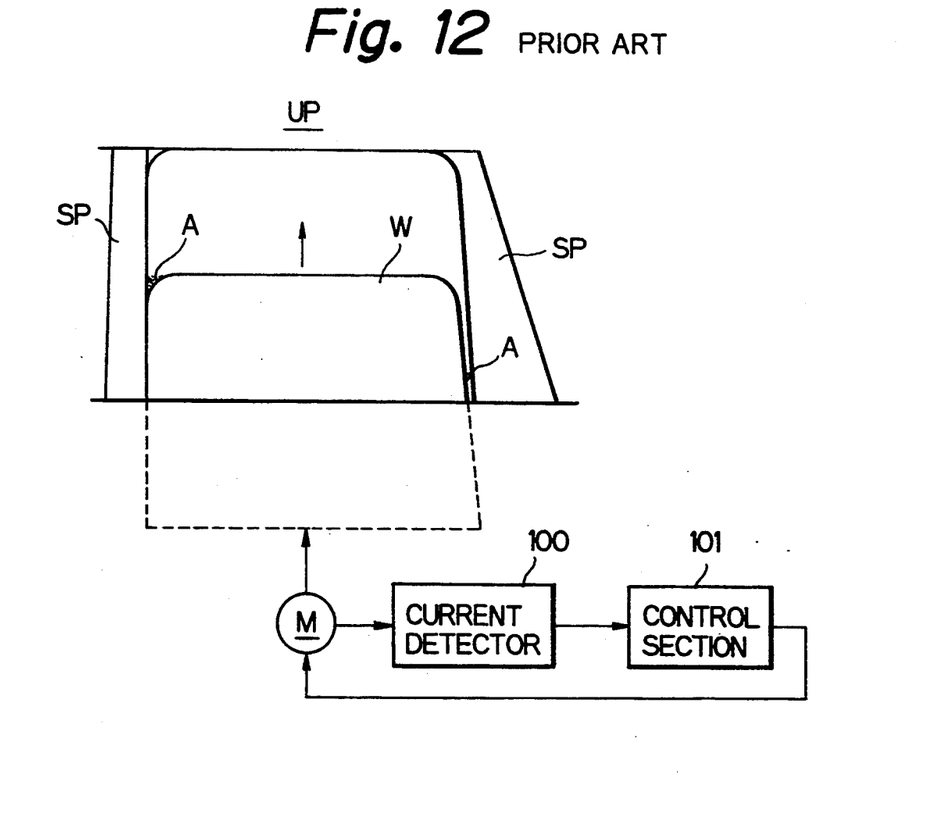
FIG. 12 is a schematic view of a conventional opening and closing apparatus for a vehicle window.
Figure 13:
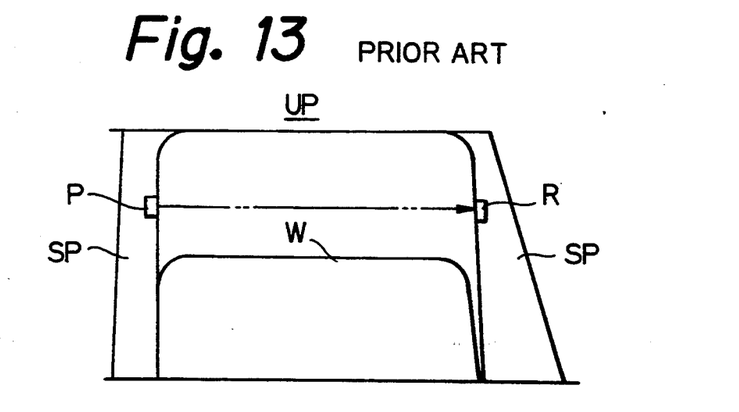
FIG. 13 is a schematic view of another conventional opening and closing apparatus for a vehicle window.

For convenience of explanation, a conventional opening and closing apparatus for a vehicle window will be described by referring to FIGS. 12 and 13. FIGS. 12 and 13 show schematic constructions of conventional different opening and closing apparatus for the vehicle window.

One of the conventional opening and closing apparatus, as shown in FIG. 12, includes a current detector 100 which detects a primary current for a motor M driving a vehicle window W and a control section 101 which controls the motor M in accordance with a detecting current from the current detector. In the case that a load is applied to the window W against movement of the window when closing the window W, the current detector 100 detects a surplus current which flows in the motor M and the control section 101 suspends driving of the motor in response to detection of the surplus current.

However, as described above, in the method for detecting the obstacle existing between the vehicle window and the window frame relying on the detection of a surplus current which flows in the motor M, the following problems arise.

First, since the window W is subject to an aging strain due to door impact, a load which is applied to the moving window upon opening and closing the window W is variable. Also, as shown in FIG. 12, a foreign substance A such as dust, small stones or the like tends to become trapped between the window W and side window frames SP. Such foreign substances A cause a load which resists movement of the window W, thereby resulting in a surplus current flow in the motor M. Consequently, if a value of the surplus current at the time of stopping the motor (hereinafter referred to as a setting value) is set to be low, an operation of opening and closing the window W may be stopped by foreign matter trapped between the window W and the side window frame SP.

In order to avoid such a problem, it is necessary to set the setting value to be sufficiently high so as not to cause the motor to stop due to load caused by trapped foreign matter. However, if the setting value is set to be higher, the motor M is not stopped before a substantially long time has lapsed since foreign matter is caught between the window W and an upper window frame UP. Accordingly, the above method suffers from a serious defect.

Another conventional opening and closing control method for a vehicle window which is not subject to the above problem, is as shown in FIG. 13, one in which a light-emitter P and a light-receiver R in a light-detector are mounted on both sides SP of the window W at the opposite positions and the window W can be opened and closed only when the light-receiver R receives a light from the light-emitter P.

However, the light-detector as shown in FIG. 13, suffers from a problem that the relative positions of the light-emitter P and the light-receiver R are not stable and may become misaligned due to a vibration of a vehicle on which they are mounted, thus resulting in light from the light-emitter P failing to reach the light-receiver R, although no obstacle is present. This problems also occurs when the window frame is slightly deformed.

SUMMARY OF THE INVENTION

A first object of the present invention is to provide an opening and closing control method for a vehicle window which is driven into open and closed positions by a driving source which is rapidly controlled upon detection of an obstacle contacting with peripheral faces of the window.

A second object of the present invention is to provide an opening and closing apparatus for a vehicle window which is driven into open and closed positions by a driving source, the apparatus being able to rapidly detect an obstacle existing between the vehicle window and a window frame.

In order to achieve the first object, the control method for the vehicle window in accordance with the present invention comprises the steps of: emitting a sound wave into said vehicle window; receiving a reflection wave of said sound wave from said vehicle window; deciding whether or not the received reflection wave is one caused by an obstacle contacting with a peripheral face of said vehicle window; and stopping or reversing an operation of said driving source when it is decided that said received reflection wave is one caused by an obstacle.

In the control method for the vehicle window, the sound wave to be emitted into said vehicle window may be in the form of continuous waves generated intermittently.

Intervals between said discontinuous waves may be changed at random.

In the control method for the vehicle window, the sound wave to be emitted into said vehicle window comprises two or more kinds of sound waves having different frequencies.

In order to achieve the second object, an opening and closing apparatus for a vehicle window which is driven into open and closed positions by a driving source, in accordance with the present invention, comprises: generator means for generating an electrical transmission signal with a given frequency; transmitter means for converting said transmission electrical signal into a sound wave and emitting said sound wave into said vehicle window; receiver means for converting said reflection-sound wave received from said vehicle window into a received electrical signal; comparator means for deciding whether or not an obstacle is in contact with said vehicle window, in accordance with said received electrical signal obtained by said receiver means and generating a decision signal corresponding to a decision; and driving controller means for stopping or reversing said driving source for opening and closing the window.

In the opening and closing apparatus for the vehicle window, said transmitter means and said receiver means are provided in a single transmitting and receiving unit and said transmitting and receiving unit is selectively connected to said generator means of said electrical transmission signal or said comparator means through a switching section of transmitting and receiving. A bonding medium for filling in an air layer may be provided between both of said transmitter means and receiver means and said vehicle window.

According to the opening and closing control method for the vehicle window in accordance with the present invention, tile second wave emitted into the vehicle window is almost reflected from the peripheral faces of the window when no obstacle is in contact with the peripheral faces since sound impedances of the vehicle window and the air are greatly different. When an obstacle in contact with the peripheral faces of the vehicle window, a part of the sound wave is not reflected from the peripheral faces but rather enters the obstacle by way of a boundary face between the vehicle window and the obstacle and is then reflected from said boundary face.

The reflection wave reflected from the boundary face existing between the object and the air layer then penetrates the vehicle window again. In comparison with the reflection wave reflected from the peripheral faces of the vehicle window, the reflection wave penetrated into the vehicle window after being reflected from the peripheral faces of the obstacle has a lower energy value due to penetrations from the vehicle into the obstacle and from the obstacle into the vehicle window.

Accordingly, when a detected reflection wave differs from a reference reflection wave reflected from the peripheral faces of the vehicle window, an obstacle is deemed to be in contact with the peripheral faces of the vehicle window. In that case, actuation of the driving source is stopped or reversed, thereby stopping or reversing movement of the vehicle window.

Further, according to the above opening and closing control method, since the reflection wave reflected from the surface of an obstacle takes a longer period to reach the detection position in comparison with the reflection wave reflected from the peripheral faces of the vehicle window, it is possible to detect any obstacle contacting with the vehicle window in accordance with time detection of reflection waves, to separate noise which occurs at a certain interval from the reflection wave, and to separate out such noise which occurs successively from the reflection wave.

According to the opening and closing apparatus for the vehicle window in accordance with the present invention the sound wave emitted into the vehicle window by the transmitter means is reflected from the peripheral faces of the vehicle window when no obstacle is in contact with the peripheral faces while a part of the sound wave penetrates into the obstacle and reflects from the surface of the obstacle when in contact with the peripheral faces of the vehicle window.

An energy level of the reflection wave to be detected by the receiver means is different between the cases when the obstacle contacts with the peripheral faces of the vehicle window and when no obstacle contacts with the faces. When the received electrical signal converted from the reflection wave by the receiver means is compared with a reference signal reflected from the peripheral faces of the vehicle window by the comparator means, it is possible to decide whether the reflection wave received by the receiver means is a reflection wave in the case that the obstacle contacts with the peripheral faces of the vehicle window or a reflection wave in the case that no obstacle contacts with the faces.

Accordingly, a signal from the driving controller means stops or reverses the driving source of the window, so that the vehicle window stops at its present position or returns to its original position.

In addition, according to the above opening and closing apparatus for the vehicle window, the transmitting and receiving unit can provide an electrical transmission signal to the transmitter means while connecting the generator means of the electrical transmission signal and the transmitting and receiving unit and can provide the received electrical signal to the comparator means while connecting the transmitting and receiving unit and the comparator means; and the bonding medium can prevent or effect a decrease of an attenuation of the emitted sound wave between the transmitter means and the vehicle window and can prevent or effect a decrease of an attenuation of the reflection wave between the vehicle window and the receiver means.

DETAILED DESCRIPTION OF THE PREFERRED EMBODIMENTS

Referring now to FIGS. 1 to 11, embodiments of an opening and closing apparatus for a vehicle window in accordance with the present invention will be described below.

Figure 1:
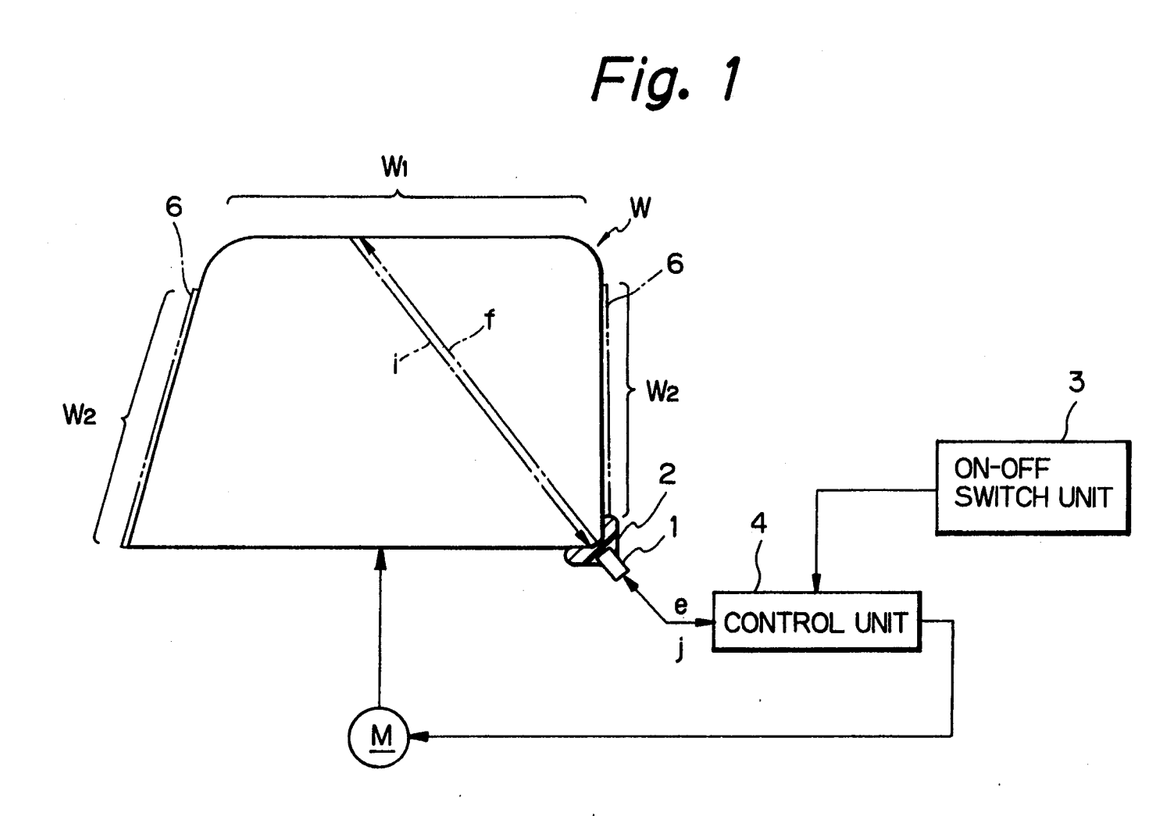
FIG. 1 is a schematic view of an opening and closing apparatus for a vehicle window in accordance with the present invention.
Figure 2:
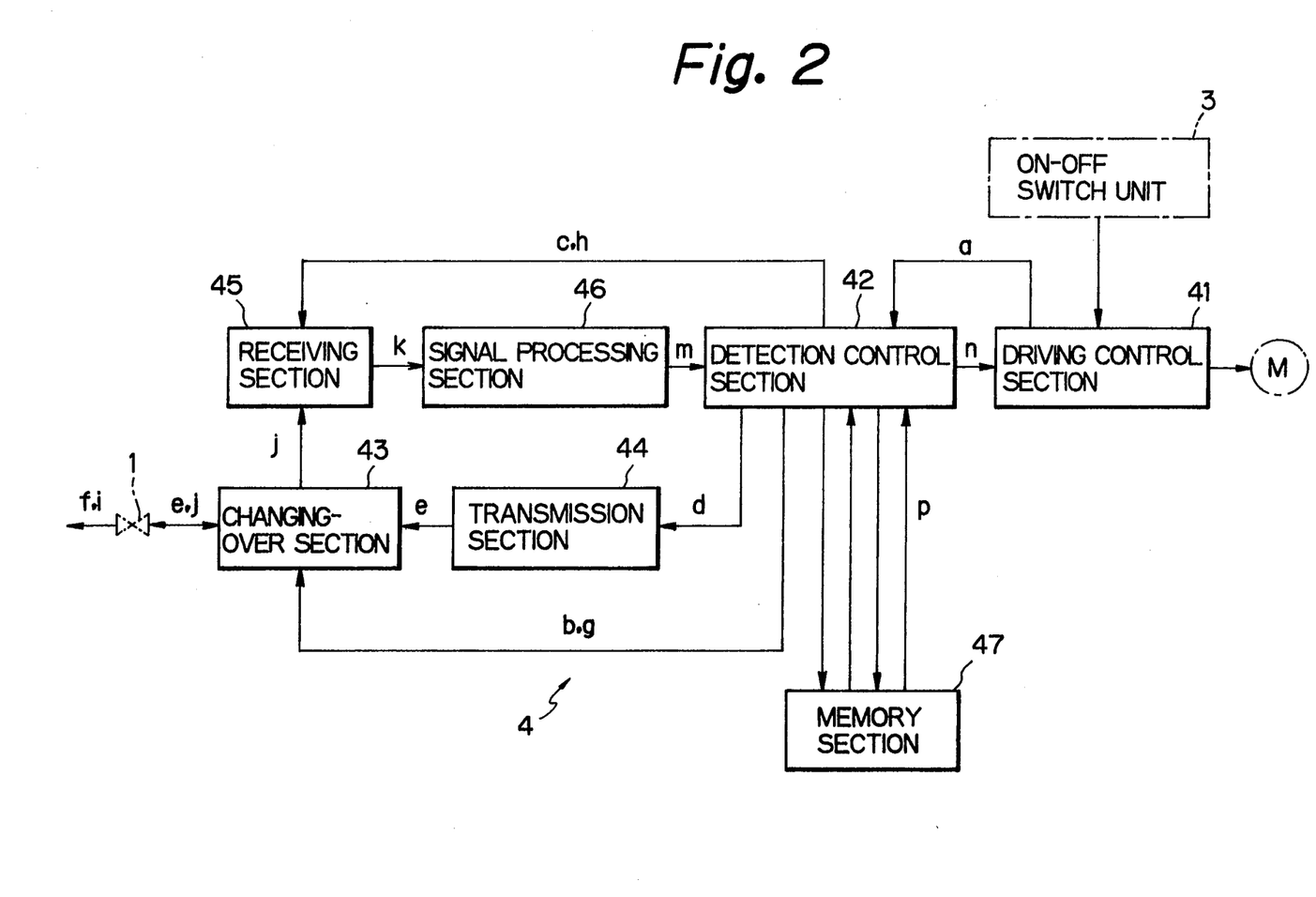
FIG. 2 is a block diagram of a control unit.

FIGS. 1 and 2 show a schematic construction of an opening and closing apparatus for a vehicle window.

A window W for a vehicle shown in FIG. 1 is made of glass and is moved down and up by a reversible motor M by operating an on-off switch 3 so that the window W is opened and closed. The window W is the same as that shown in FIGS. 12 and 13. For convenience of explanation, the side window frames SP and the upper window frame UP are omitted from FIG. 1. Also, since an opening and closing mechanism of the window W is known, detailed explanation thereof is omitted.

The opening and closing apparatus for the vehicle window comprises a transmitting and receiving unit 1, a bonding medium 2, an on-off switch unit 3, and a control unit 4.

The transmitting and receiving unit 1 is disposed on an end of a lower side of the window W. The unit 1 has a transmission function which emits a supersonic wave f into the window W and a receiving function which receives a reflection wave i of the supersonic wave f reflected from the peripheral faces of the window W. The transmitting and receiving unit 1 includes an ultrasonic ceramic microphone. It can convert a given electrical transmission signal e into supersonic wave f which mechanically vibrates and transmits the supersonic wave f and can receive the reflection wave i of the supersonic wave f and convert the received reflection wave i into a received electrical signal j.

An energy level of the reflection wave which is received by the transmitting and receiving unit i becomes low, since a directional center of the reflection wave i reflected from the peripheral faces of the window W does not coincide with the unit 1 when the supersonic wave f transmitted from the unit 1 is reflected from the peripheral faces. Accordingly, as shown in FIG. 4A, the peripheral face of the window W, in particular, an upper side face w1 which detects an obstacle is formed into a fine uneven surface so that the supersonic wave is irregularly reflected on the upper side face w1, thereby causing the directional center of the reflection wave i to be accorded with the unit 1. In this case, as shown in FIG. 4B, an adhesive tape 5 having a fine uneven surface may be attached to the upper side face w1 of the window W.

The supersonic wave f transmitted from the unit i and emitted into the window W is propagated in all directions in the window W and thus a part of the wave f reaches opposite side faces w2 of the window W. However, the reflection wave reflected from the opposite side faces w2 is not necessary for detecting an obstacle since the obstacle is trapped on the upper side face w1 of the window w. Preferably, as shown by two-dot chain lines in FIG. 1, a sound absorber 6 may be attached to each of the opposite side faces w2, thereby suppressing occurrence of unnecessary reflection waves.

The bonding medium 2 is disposed between the window W and a transmitting and receiving face of the unit 1. Preferably, the bonding medium 2 is made of a material which has substantially the same sound impedance as that of glass and does not separate from the glass due to a vibration or the like. For example, an adhesive such as epoxide resin or the like is preferable. The bonding medium 2 serves to closely bond the unit 1 to the window W.

Since the sound impedance of air is about $1/(3 \times 10^4)$ in comparison with that of glass which constitutes the window, almost the entire supersonic wave is reflected on the boundary face between the window W and the unit 1 if the bonding medium 2 is not provided on the boundary face. Consequently, it is difficult to receive the reflection wave i reflected from the peripheral faces of the window at a sufficient energy level. The coupling medium may be made of silicon grease, mercury, or the like as well as the above adhesive.

FIGS. 5A to 5C are enlarged views illustrating constructions of bonding the unit 1 and the vehicle window W. In the construction shown in FIG. 5A, the transmitting and receiving unit 1 is disposed at a corner of the window W so that the directional center line CL of the supersonic wave f which is transmitted from the unit 1 and passes through the bonding medium 2 extends towards the upper side face w1 and the directional center line CL intersects perpendicularly with a face w3 of the window W for the supersonic wave f and reflection wave i. Consequently, a directional center line CL1 of the supersonic wave f after being emitted into the window W extends towards the upper side face w1.

FIGS. 5B and 5C show another constructions of bonding the unit 1 and the window W.

In the construction shown in FIG. 5B, the unit 1 is disposed at a corner of the window W so that the directional center line CL of the supersonic wave f which is transmitted from the unit 1 and passes through the bonding medium 2 is refracted on the face w3 of the window W, thereby extending the directional center line CL1 of the supersonic wave f after being emitted into the window W towards the upper side face w1. In this case, it is possible to change a direction of the directional center line CL of the supersonic wave passing through the coupling medium 2, i.e., an attaching angle of the unit 1 by changing an angle of the face w3.

In the construction shown in FIG. 5C, which is similar to that of FIG. 5B, the directional center line CL of the supersonic wave f passing through the bonding medium 2 is refracted on the face w3 so that the directional center line CL1 of the supersonic wave f after being emitted into the window W extends towards the upper side face w1. The face w3' of the window W is formed into a serrated shape which has an even inclination, as shown in FIG. 5C. This serrated face w3' may be arranged at any position on the peripheral faces of the window W.

The on-off switch unit 3 includes an operating section (not shown) provided in the room in the automobile and sends to a driving control section 41 of the control unit 4 described hereinafter opening and closing signals which indicate an operation of opening and closing the window W.

The control unit 4 is electrically connected to the transmitting and receiving unit 1 and the on-off switch unit 3. The control unit 4 drives the motor M to actuate the window W by displacing the operating section in the on-off switch unit 3 to an "open" position or a "closed" position while turning on an ignition switch (not shown) of the automobile.

However, the window W may be opened and closed by the operating section as long as a given condition exists, even if the ignition switch is turned off.

Figure 3:
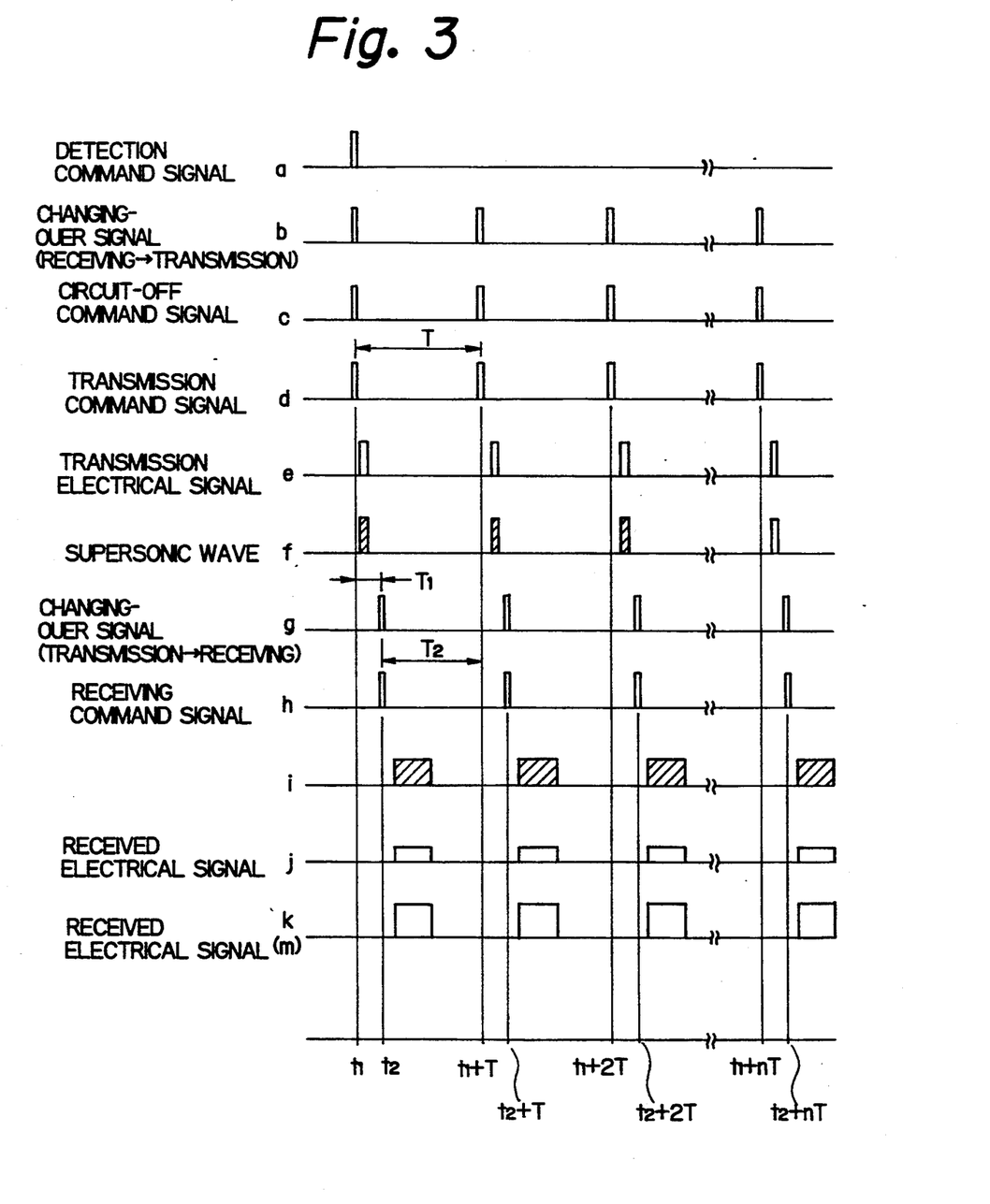
FIG. 3 is a timing chart illustrating a timing of occurrence of each signal.
Figure 4:
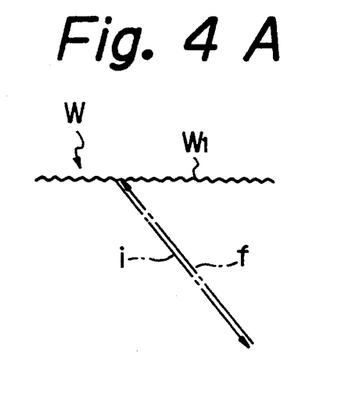
FIGS. 4A and 4B are explanatory view illustrating conditions of peripheral faces of a window.
Figure 5:
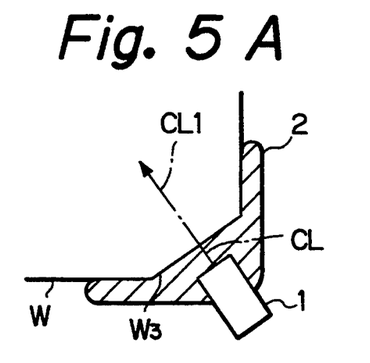
FIGS. 5A, 5B, and 5C are explanatory views illustrating conditions of disposing a transmitting and receiving unit.
Figure 6:
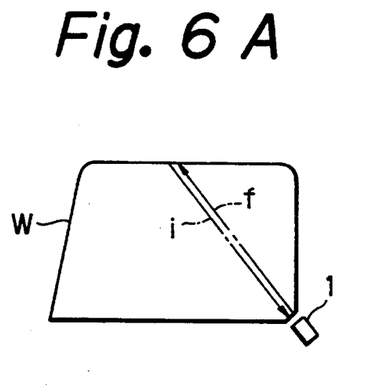
FIGS. 6A and 6B are explanatory views of a method of detecting an obstacle which contacts with a window.
Figure 7:
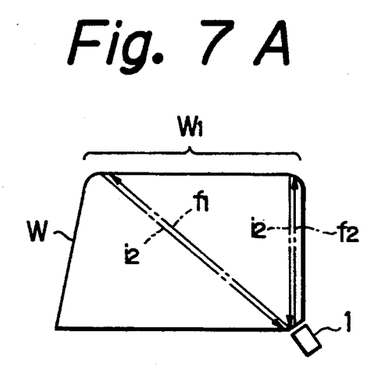
FIGS. 7A and 7B are explanatory views of a method of determining a contacting position of an obstacle.

The control unit 4, as shown in FIG. 3, applies a transmission electrical signal (e) to the unit 1 at a given timing. Further, the control unit 4 decides whether or not an obstacle contacts with the window W to interfere opening and closing of the window W, in accordance with an electrical signal (j) received from the unit 1, and stops the motor in accordance with the decision.

FIG. 2 shows an example of the control unit 4. The control unit 4 includes the driving control section 41, a changing-over section 43, a transmission section 44, a receiving section 45, a signal processing section 46, a memory section 47 and a detection control section 42.

The driving control section 41 drives the motor M in a given direction to open or close the window W in response to a command signal generated by displacing the operating section of the on-off switch to the "open" position or to the "closed" position. As shown in FIG. 3, the driving control section 41 also applies a detection command signal (a) to the detection control section 42 described below when the on-off switch unit 3 is set to the "closed" position. Further, when the driving control section 41 receives an obstacle-detecting signal (n) from the detection control section 42, the section 41 stops to drive the motor M and drives the motor M in the reverse direction for a given period of time.

The detection control section 42 reads out a program for detecting the obstacle from the memory section 47 in response to the detection command signal (a) from the driving control section 41 and controls the changing-over section 43, the transmission section 44, and the receiving section 45 in accordance with the program. That is, when the detection control section 42 receives the detection command signal (a) as shown in FIG. 3, the section 42 applies to the changing-over section 43 a changing-over signal (b) which maintains the section 43 in a transmission state and applies a circuit-off command signal (c) to the receiving section 45. Also, the detection control section 42 applies a transmission command signal (d) to the transmission section 44 simultaneously with transmitting the changing-over signal (b) and the circuit-off command signal (c).

In addition, the detection control section 42 applies to the changing-over section 43 a changing-over signal (g) which maintains the section 43 in the receiving state and applies a receiving command signal (h) to the receiving section 45, at a time after passing for a first given period T1 from a time t1 when the section 42 applied the transmission command signal (d) to the transmission section 44. A manner of setting the first given period will be described hereinafter. The detection control section 42 applies the changing-over signal (b) to the changing-over section 43 again the circuit-off command signal (c) to the receiving section 45, and the transmission command signal (d) to the transmission section 44 at a time after passing for a second given period T2 from a time t2 when the section 42 applied the receiving command signal (h) to the receiving section 45. A manner of setting the second T2 will be described below.

Then, the detecting control section 42 alternately repeats the transmission mode during the first given period T1 after outputting the changing-out signal (b), the circuit-off command signal (c), and the transmission command signal (d) and the receiving mode during the second given period T2 after outputting the changing-over signal (g) and the receiving command signal (h).

The detection control section 42 receives a received electrical signal (m) from the signal processing section 46 including information as to whether or not an obstacle exists between the window W and the window frame and memorizes a result of comparing the received electrical signal (m) and a reference signal (p) memorized in the memory section 47 and having a given level.

A manner of comparing the received electrical signal (m) and the reference signal (p).

In addition, the detection control section 42 decides whether or not an obstacle contacts with a detection target on the window W, in accordance with the comparison of the reference signal (p) and the received electrical signals (m) successively memorized in the memory section 47 and applies the obstacle-detection signal (n) to the driving control section 41 in the case that the obstacle contacts with the detection target. Here, the obstacle-detection signal (n) is transmitted when the levels of the received electrical signals (m) corresponding to predetermined number of successive transmission command signals (d) are all below the level of the reference signal (p).

The changing-over section 43 selectively changes over the transmission mode connecting the transmission section 44 to the transmitting and receiving unit 1 to the receiving mode connecting the receiving section 45 to the unit 1 and vice versa. The changing-over section 43 carries out an operation of changing-over between the transmission and receiving modes in accordance with the changing-over signals (b) and (g) from the detection control section 42.

The transmission section 44 generates the electrical transmission signal (e) having a frequency within a range of a supersonic wave from a known reference oscillation circuit such as a digital type pulse generator or the like in response to the transmission command signal (d) and applies the electrical transmission signal (e) through the changing-over section 43 to the unit 1.

The receiving section 45 gets the received electrical signal (j) outputted from the unit 1 through the changing-over section 43 in response to the received command signal (h) from the detection control section 42. Then, the received electrical signal (j) to be received by the receiving section 45 is a signal which is converted in the unit 1 from the reflection wave 1 of the supersonic wave f emitted into the window W during the first given period T1. The receiving section 45 amplifies the received electrical signal (j) and generates the received electrical signal (k) by filtering the signal (j). The receiving section 45 applies the signal (k) to the signal processing section 46. However, the receiving section 45 is not activated by the received electrical signal (j) when the section 45 receives the circuit-off command signal (c) from the detecting control section 42.

The signal processing section 46 shapes a wave of the electrical signal (k) received from the receiving section 45 and converts the wave-shaped electrical signal (k) into an A/D signal. The signal processing section 46 applies to the detection control section 42 the digital electrical signal (m).

The memory section 47 memorizes an action program for the detection control section 42 and the reference signal (p) to be compared with the received electrical signal (m) in the detection control section 42. As described above, the program memorized in the memory section 47 is read out when the detection section 42 receives the detection command signal (a) from the driving control section 41. Also, the reference signal (p) memorized in the memory section 47 is read out when the detection control section 42 receives the received electrical signal (m) from the signal processing section 46.

The first given period T1 is set so that the changing-over section 43 is changed over from the transmission mode to the receiving mode and the unit 1 can receive the first one of the reflection wave i of the supersonic wave f which reaches the unit 1 from the window W. The second given period T2 is set so that the changing-over section 43 is changed over from the receiving mode to the transmission mode after all reflection waves i of the supersonic wave f emitted into the window W by the unit 1 are received by the unit 1. Preferably, the first and second given periods T1 and T2 are set to be minimum value in the range which meets the above requirement, in order to get the received electrical signal (m) in a possible short cycle.

Next, a method of opening and closing a vehicle window which is carried out by the above apparatus of opening and closing the window W, that is, a method of opening and closing the window W in accordance with detection of an obstacle between the window W and a window frame will be explained below.

When no obstacle is in contact with the peripheral faces of the window W as shown in FIG. 6A, that is, the peripheral faces of the window W comprises a boundary face between the peripheral faces and an air layer, an almost supersonic wave f which is transmitted and emitted from the transmitting and receiving unit 1 into the window W is reflected on the peripheral faces of the window W and a part of the reflection wave i is received in the unit 1.

When an obstacle A contacts with the peripheral face of the window W as shown in FIG. 6B, a part of the supersonic wave f which reaches the boundary face between the obstacle A and the peripheral face of the window W enters into the obstacle, since the sound impedance of the obstacle A is closer to that of glass than air.

The supersonic wave f entered into the obstacle A is reflected on the surface of the obstacle, i.e., a boundary face between the obstacle and an air layer. A part of the reflection wave i of the supersonic wave f reflected on the surface of the obstacle A enters again into the window W through the boundary face between the obstacle A and the window W and is received in the unit 1.

When the obstacle A contacts with the peripheral faces of the window W, a strength of the supersonic wave f lowers every passing through the boundary faces, since the supersonic wave f passes at twice through the boundary face between the window W and the obstacle A before the supersonic wave f is received in the unit 1 as the reflection wave i. That is, when the reflection wave i of the supersonic wave f entered into the obstacle A is received in the unit 1, a level of a receiving electrical signal m received in the detection control section 42 lowers partially. Accordingly, if the level of the receiving electrical signal m is predetermined when the reflection wave i reflected on the peripheral faces of the window W is received in the unit 1, and a level of the reference signal p to be memorized in the memory section 47 in accordance with the predetermined level, it is possible to decide in the control section 42 whether or not the received electrical signal m is the signal when the obstacle A contacts with the window on the basis of the reference level as a threshold value.

In the case that an upper side-face w1 of the window W is a target to be detected and the transmitting and receiving unit 1 is disposed an end of a lower side of the window as shown in FIG. 1, a going distance on which the supersonic wave emitted from the unit 1 reaches the upper side face w1 of the window W is different from a coming distance on which the reflection wave i of the supersonic wave f reflected on the upper side w1 reaches the unit 1 in accordance with a position of the upper face w1.

That is, as shown in FIG. 7A, when f1 is the supersonic wave f which is emitted from the unit 1 to an end of the upper side face w1 and f2 is the supersonic wave f which is emitted from the unit 1 to the other end of the face w1, a reflection wave i1 of the supersonic wave f1 is received in the unit 1 fastest after being transmitted from the unit 1 and a reflection wave i2 of the supersonic wave f2 is received in the unit 1 slowest after being transmitted from the unit 1.

Consequently, as shown in FIG. 7B, the emitting electrical signal e from the transmission section 44 is a spike-like pulse while the received electrical signal k in the receiving section 45 is a trapezoid-like pulse having a given duration T21 dependent on a length of the upper side face w1. Accordingly, when the obstacle A contacts with the upper side face w1, the received electrical signal k lowers the level at a time t21 corresponding to a position on which the obstacle A contacts, as shown by one dot line in FIG. 7B. That is, it is possible to sense any position on the upper side face w1 on which the obstacle A contacts by detecting the time t21 in the detection control section 42 in a known manner. Thus, since it is possible to sense the position on the target to be detected on which the obstacle A contacts, it is possible to distinguish whether the obstacle contacting with the target is a human body or a rain.

If the obstacle A is rain, it contacts with the window W at random points and a position and an area contacting with the window W change with time. These changes of the contacting position and area can be detected by sensing the position on the detection target on which the obstacle A contacts. When this is the case, an obstacle detection signal n cannot be transmitted to the driving control section 41 even if the signal n is under a condition to be generated, that is, all levels of the received electrical signals m corresponding to the successive transmission command signals d having predetermined members are below the level of the reference signal.

As described above, when the obstacle A contacts with a portion of the upper side face w1, the reflection wave i which is delayed due to passing through the obstacle A is received in the unit 1 simultaneously with the reflection wave i reflected on a position on the peripheral face of the window W further away from the unit 1 than the contacting position of the obstacle A. Consequently, when the obstacle A contacts with a portion of the upper side face w1 the received electrical signal k has a contact detection portion kd a level of which is raised as a pulse at a time t22 after the time t21. Accordingly, it is possible to detect whether or not the obstacle A contacts with the upper side face w1 even by detecting the contact detection portion kd in accordance with the received electrical signal m in the detection control section 42.

Figure 8:
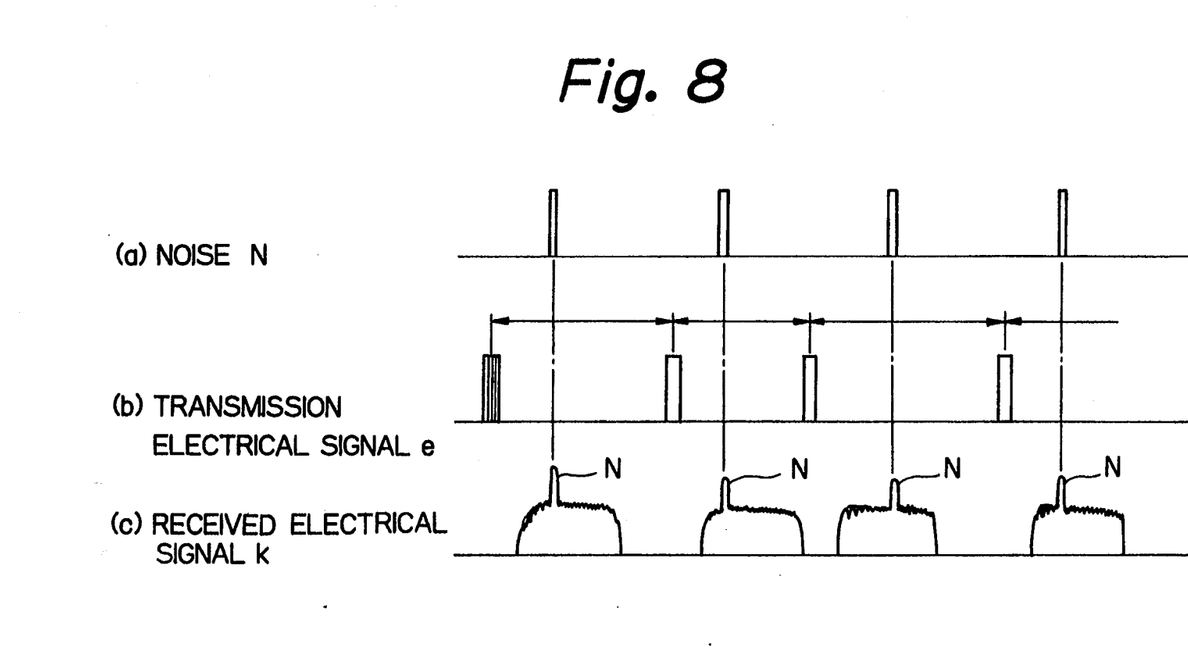
FIG. 8 is a wave-diagram illustrating a method of preventing an influence due to noises caused intermittently.

In an automobile, as shown in FIG. 8, successive noises N(a) are inclined to be generated at an even interval. In the case that the contact of the obstacle A is sensed by detecting the contact detection portion kd, the noise N is superimposed on the received electrical signal k(c) and the detection control section 42 misdetects the noise N as the contact detection portion kd. This may cause a wrong operation. In the timing chart (b) in FIG. 8, the electrical transmission signals e are transmitted at a random timing from the detection control section 42 in order to prevent the wrong operation.

Thus, a generating timing of the received electrical signal k is changed in accordance with a transmission timing of the electrical transmission signal e. On the other hand, since the noise N is generated at a constant interval, the received electrical signals k(c) become different shapes when pulse-like projection on the received electrical signal k is the noise.

On the other hand, when the pulse-like projection on the received electrical signal k is the contact detection portion kd, the shape of the received electrical signal k is not changed greatly every the transmission command signal d. Accordingly, if a fact that the shapes of the received electrical signals k corresponding to the successive (for example four times) transmission command signal d are all same is a condition of decision that any obstacle A contacts with the detection target of the window W, it is possible to prevent the detection control section 42 from misoutputting the obstacle detection signal n when the pulse-like projection on the received electrical signal k is a projection due to the noise N.

Figure 9:
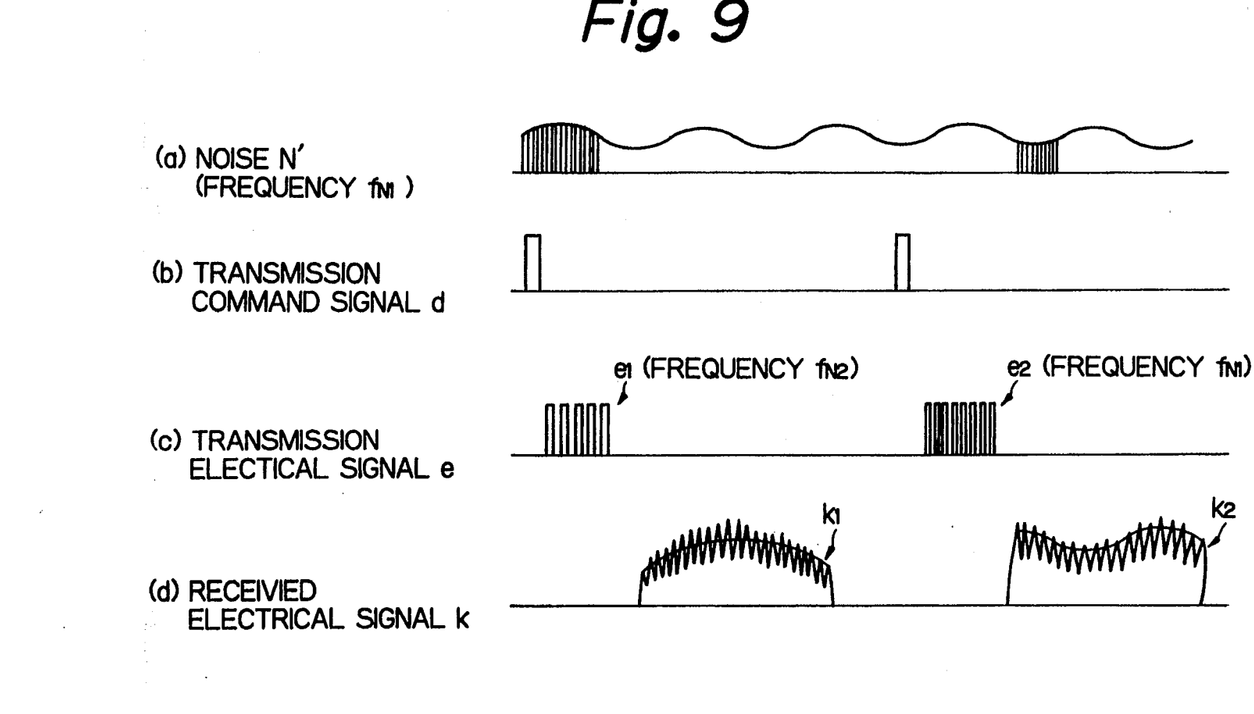
FIG. 9 is a wave-diagram illustrating a method of preventing an influence due to noise successively.

A noise N' having a frequency fN1 shown by (a) in FIG. 9 may be continuously superimposed on the received electrical signal k. If the noise N' is superimposed on the signal k, the signal k containing the continuous noise is generated. It is impossible to prevent such signal k from causing a wrong operation only by making the generating timing of the electrical transmission signal e at random shown by (b) in FIG. 8.

Another embodiment of the opening and closing apparatus for the vehicle window in accordance with the present invention can prevent the wrong operation due to the noise N' shown by (a) in FIG. 8 by alternately generating two kinds of electrical transmission signals e1 and e2 having different frequencies shown by (c) in FIG. 9. That is, received electrical signals k1 and k2 ((d) in FIG. 9) formed by the electrical transmission signals e1 and e2 (c) have substantially the same delay time and general wave shape as those of the signals e1 and e2.

However, in the case that the noise N' having the frequency fN1 (a) is superimposed on the received electrical signals k1 and k2, there is a very low probability of coinciding with the frequencies of the received electrical signal k2 and the noise N' at the same timing of coinciding with the frequencies of the received electrical signal k1 and the noise N'. As shown by, for example, (d) in FIG. 9, the received electrical signals k1 and k2 on which the noise N' is superimposed become the received electrical signal k2 containing the noise and the shapes of the signals k1 and k2 do not become the same. Thus, it is possible to alter the received electrical signals k1 and k2 on which the noise N' is superimposed to the received electrical signals k1 and k2 having the different wave shapes (d) by alternately generating the transmission electrical signals e1 and e2 having the different frequencies (c).

Accordingly, it is possible to prevent the detection control section 42 from misoutputting the obstacle detection signal n due to the noise N' by deciding that any obstacle A contacts with the detection target of the window W when the position of the pulse-like projections on the received electrical signals k1 and k2 are same or substantially same.

As described above, each received electrical signal k formed in accordance with the transmission signal e every occurrence of the transmission command signal d has substantially the same delay time with respect to the corresponding transmission command signal d. Accordingly, it is possible to estimate an occurrence time range of the received electrical signal k formed in accordance with the transmission command signal d and to decide that the received electrical signal k generated without the estimated occurrence time range is the noise. Thus, it is possible to prevent the wrong operation due to the accidental noise by eliminating a signal portion which is decided to be the noise portion from an object to be compared with the reference signal P.

Figure 10:
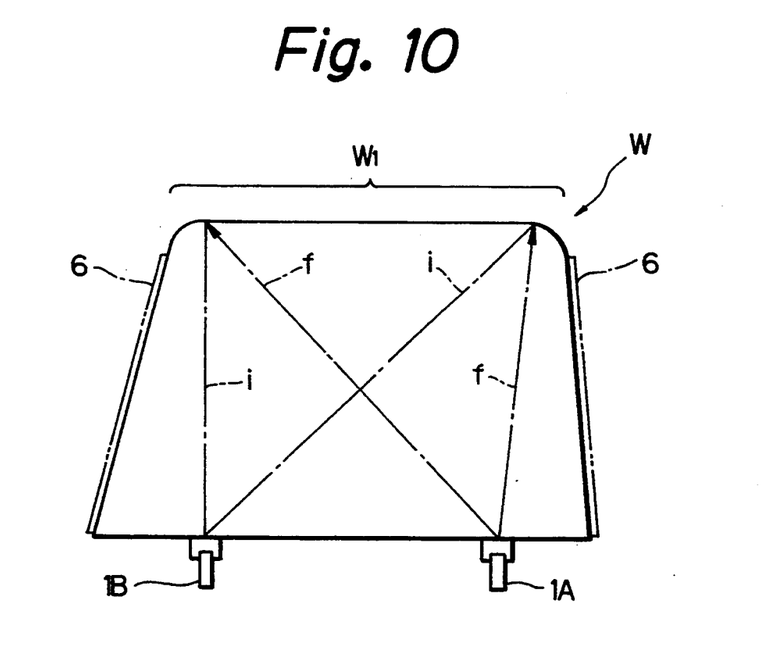
FIG. 10 is an explanatory view illustrating a case separated into a transmitter and a receiver.
Figure 11:
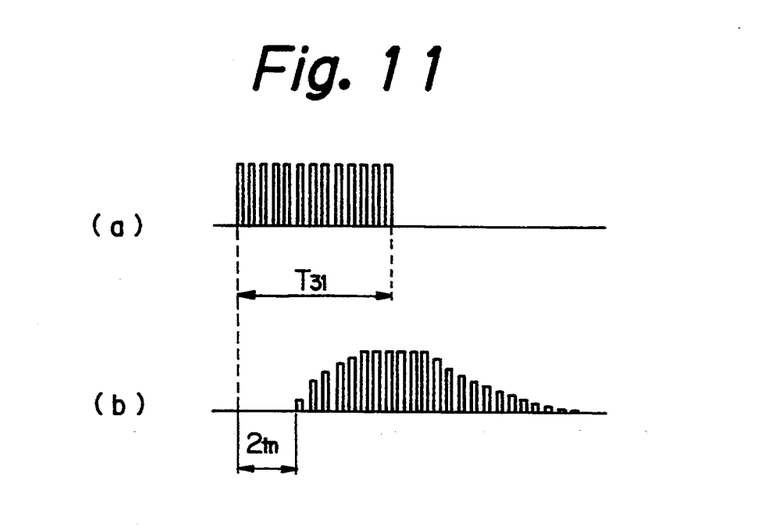
FIG. 11 is a wave diagram of transmission and received waves from the transmitter and the receiver.

Although the opening and closing apparatus for the vehicle window described above utilizes the transmitting and receiving unit 1 having a transmitter and a receiver, a transmitter 1A and a receiver 1B may be individually provided as shown in FIG. 10. The individual transmitter 1A and receiver 1B need no changing-over section 43. As shown in FIG. 11, in the case that the transmitter 1A and the receiver 1B are individually provided and the transmitter 1A transmits the supersonic wave during only a transmitting period T31 (a), the receiver 1B receives a reflection wave (b). The transmitting period T31 is longer than that of the supersonic wave f in the embodiment shown in FIG. 3 or the like.

The reflection wave shown by (b) in FIG. 11 stands up by a delay time 2tn with respect to the transmission supersonic wave (2tn is the shortest period from the time when the transmitter 1A transmits the supersonic wave to the time when the receiver 1B receives the reflection wave.). Also, the reflection wave (b) is gently sloping. The reflection wave (b) can not detect the contact of obstacle from the change of wave form even if the obstacle contacts with the peripheral faces of the window. Accordingly, in the case, the contact of obstacle can be detected by summing the received levels of the received reflection waves and comparing the summed value with the set reference.

Thus, the provision of the individual transmitter 1A and receiver 1B makes the transmitting period T31 longer than the provision of the common transmitting and receiving unit 1. That is, it is possible to obtain a vibration frequency necessary to detect the obstacle during the transmission period T31 even if a frequency of the supersonic wave is relatively low and to reduce the cost of a vibration circuit.

When the transmitter 1A and the receiver 1B are individually provided the transmitter can emit the supersonic wave continuously. Although such continuous transmission of the supersonic wave encounters a problem in which the received level becomes low due to a possibility of directly receiving the transmitted wave by the receiver 1B, the continuous transmission has an advantage of rapidly detecting the obstacle contacting with the window W in comparison with intermittent transmission of the supersonic wave.

Although in the above embodiment a second wave to be emitted into the vehicle window is all a supersonic wave, an audible sound may be used in the case of making the transmission period T31 relating long as shown by the supersonic wave (a) in FIG. 11.

According to the method of the present invention, since it is possible to quickly control the driving source of the vehicle window when the obstacle contacts with the detection target on the peripheral faces of the window, it is possible to avoid an accident of trapping the obstacle between the vehicle window and the window frame by stopping the window before really trapping the obstacle therebetween.

Further, according to the method of the present invention, it is possible to determine the position of detecting the obstacle by utilizing a time shift of receiving the supersonic wave reflected on the detection target. It is also possible to utilize the transmitting and receiving unit in order to detect the obstacle contacting with the detection target and to make the opening and closing apparatus for the vehicle window which carries out the above method a compact size. Errors due to the noises caused at a certain interval and continuously can be prevented.

According to the apparatus of the present invention, since it is possible to rapidly stop or return the vehicle window when the obstacle contacts with the detection target on the peripheral faces of the vehicle window, it is possible to prevent accidental trapping of the obstacle between the window and the window frame or of lifting of the obstacle by the window.

Further, according to the apparatus of the present invention, it is possible to make a space for receiving small parts and to suppress attenuation of the supersonic wave and its reflection wave, thereby carrying out a reliable operation.

What is claimed is:

1. An opening and closing control method for a vehicle window which is driven into open and closed positions by a driving source, comprising the steps of:
   emitting a sound wave into said vehicle window;
   receiving a reflection wave of said sound wave from said vehicle window;
   deciding whether or not the received reflection wave is one caused by an obstacle contacting with a peripheral face of said vehicle window; and
   stopping or reversing an operation of said driving source when it is decided that said received reflection wave is one caused by contact of an obstacle.

2. A method according to claim 1, wherein said sound wave to be emitted into said vehicle window is in the form of discontinuous waves generated intermittently.

3. A method according to claim 2, wherein intervals between said discontinuous waves are changed at random.

4. A method according to claim 1, wherein said sound wave to be emitted into said vehicle window is two or more kinds of sound waves with different frequencies.

5. An opening and closing apparatus for a vehicle window which is driven into open and closed positions by a driving source, comprising:
   generator means for generating an electrical transmission signal with a given frequency;
   transmitter means for converting said electrical transmission signal into a sound wave and emitting said sound wave into said vehicle window;
   receiver means for converting said reflection sound wave received from said vehicle window into a received electrical signal;
   comparator means for deciding whether or not an obstacle contacts with said vehicle window in accordance with said received electrical signal obtained by said receiver means and generating a decision signal corresponding to a decision; and
   driving controller means for stopping or reversing said driving source for opening and closing the window.

6. An apparatus according to claim 5, wherein said transmitter means and said receiver means are provided in a single transmitting and receiving unit and wherein said transmitting and receiving unit is selectively connected to said generator means of said transmission electrical signal or said comparator means through a switching section of transmitting and receiving.

7. An apparatus according to claim 5, wherein a bonding medium for filing in an air layer is provided between both of said transmitter means and receiver means and said vehicle window.

* * * * *